United States Patent

Wong et al.

[11] Patent Number: 6,033,330
[45] Date of Patent: Mar. 7, 2000

[54] BELT NOISE/VIBRATION CONTROL MECHANISM

[75] Inventors: Chee-Chiu Joseph Wong, Fairport; Walter J. Sanborn, West Henrietta, both of N.Y.

[73] Assignee: Xerox Corporation, Stamford, Conn.

[21] Appl. No.: 08/477,963

[22] Filed: Jun. 7, 1995

Related U.S. Application Data

[63] Continuation-in-part of application No. 08/196,741, Feb. 15, 1994, abandoned, which is a continuation-in-part of application No. 07/722,734, Jun. 27, 1991, abandoned.

[51] Int. Cl.[7] .................................................. F16H 7/08
[52] U.S. Cl. ...................................... 474/133; 474/135
[58] Field of Search ................................ 474/133, 135, 474/117

[56] References Cited

U.S. PATENT DOCUMENTS

| | | | |
|---|---|---|---|
| 1,286,482 | 12/1918 | Yoder | 242/11 |
| 1,513,473 | 10/1924 | Ackerman | 474/135 |
| 1,847,720 | 1/1932 | Marcellis . | |
| 2,549,038 | 4/1951 | Zenner | 474/135 |
| 2,913,192 | 11/1959 | Mullin | 242/55.11 |
| 3,490,302 | 1/1970 | Turner et al. | 74/242.11 |
| 3,636,786 | 1/1972 | Buck | 474/242.11 R |
| 4,459,123 | 7/1984 | Tatsunaka et al. | 474/87 |
| 4,525,152 | 6/1985 | Speer et al. | 474/133 |
| 4,869,707 | 9/1989 | Zandt | 474/115 |
| 4,908,006 | 3/1990 | Burysek et al. | 474/117 |
| 4,908,007 | 3/1990 | Henderson | 474/135 |
| 4,983,146 | 1/1991 | Charles | 474/117 |
| 5,176,580 | 1/1993 | Stamm et al. | 417/133 X |

FOREIGN PATENT DOCUMENTS

| | | | |
|---|---|---|---|
| 1081876 | 12/1954 | France | 474/135 |
| 1346804 | 11/1963 | France . | |
| 2902182 | 7/1980 | Germany | 474/135 |
| 18203 | 10/1891 | United Kingdom | 474/135 |
| 2056014 | 3/1981 | United Kingdom | 474/135 |

OTHER PUBLICATIONS

Vibration Damping by Ahid D. Nashif et al., Distributed by John Wiley & Sons, Inc., New York, NY 1985, Chapter 5, pp. 189 Through 215.

*Primary Examiner*—Hoang Dang

[57] ABSTRACT

A tuned damping element is attached to an idler operating on timing belts of belt drive systems, in order to reduce the noise generated by these systems while simultaneously providing tension to the belts and providing the support and resiliency required for noise abated idler operation.

1 Claim, 2 Drawing Sheets

BELT NOISE/VIBRATION CONTROL MECHANISM

This application is a continuation-in-part of application Ser. No. 08/196,741 filed Feb. 15, 1994, now abandoned, which was a continuation-in-part of abandoned application Ser. No. 07/722,734 filed Jun. 27,1991, now abandoned.

BACKGROUND OF THE INVENTION

This invention relates to a belt noise control mechanism for use in a wide variety of machines, for example, copier/printers.

Excessive noise from machines, such as, copier/printers in working environments has been an irritant to users from the advent of such machines until the present day. One of the major contributors to machine noise has been found to be idlers of timing belt systems. At low speed, noise from idlers is as high as that of the timing belt and pulley system combined. At higher speeds, the noise level of an idler has been found to be an order of magnitude higher as shown in FIG. 1. This is because typical idler systems found in copiers, printers, duplicators, etc., will not only generate noise, but tend to transmit and in some cases amplify the vibratory energy of the belts to the machine frame and covers. This undesirable mechanical energy is radiated as noise. A need clearly exists for a means to control noise in machines.

Noise and vibration problems are caused by tolerance build up and variations in materials among the moving parts. To name some of them, they are as follows: non-concentric of the drive shafts, non-concentric of the pulley, variations in the teeth of the pulleys and imperfections in the belts. Imperfections in the belts may include waviness at the back of the belt, variations in belt thickness due to a seam, variations in belt thickness due to molding process or variations in the belt teeth. As a result, this will induce random motion to the belt tensioning device. Excessive noise and vibration will be generated and transmitted to the frame of the machine through the belt tensioning device.

PRIOR ART

Previous belt drive systems include U.S. Pat. No. 2,913,192 which is directed to a tape drive mechanism for driving tapes under constant tension and speed. A resilient flexing spring bent into a curve allows the tape to travel accurately to a recording head. The spring permits compliance in one direction and appears to be suitable for only light tension applications. A multi-lever and multi-spring system to slow down a portion of a belt temporarily while keeping the rest of the belt at a different speed is disclosed in U.S. Pat. No. 4,869,707. A locking assembly for a photoreceptor belt is shown in U.S. Pat. No. 4,983,146 in which a spring is used to provide an initial tension and the assembly is locked down by a locking arm. After the locking mechanism is engaged, the spring is not functioning. However, rigidly locking a belt as disclosed in this patent appears to cause unwanted and excessive noise and vibrations. U.S. Pat. No. 4,459,123 discloses the arrangement of a single or multiple belt system for maximum drive efficiency. The drive machinery that requires the most torque is located closest to the driving unit. Additional drive units are placed in descending order according to the magnitudes of the drive torques. German Patent 2,902,182 discloses a three piece coil strip used to tension a V-belt on a motor vehicle engine. In view of these patents, a need clearly still exists for a means to control noise in machines.

SUMMARY OF THE INVENTION

Accordingly, disclosed herein is an apparatus that includes an element that supports an idler, damps acoustic waves, controls the position of the idler, which controls a belt and dissipates acoustic waves to thereby diminish noise and vibration in a belt drive system. The apparatus includes a damping element connected to an idler and appropriate mounting structure. The damping element which can be tuned dissipates and/or isolates the source of noise and/or vibration energy that would otherwise be generated, transmitted, propagated and amplified throughout the belt drive system.

DETAILED DESCRIPTION OF THE INVENTION

Figure 1:
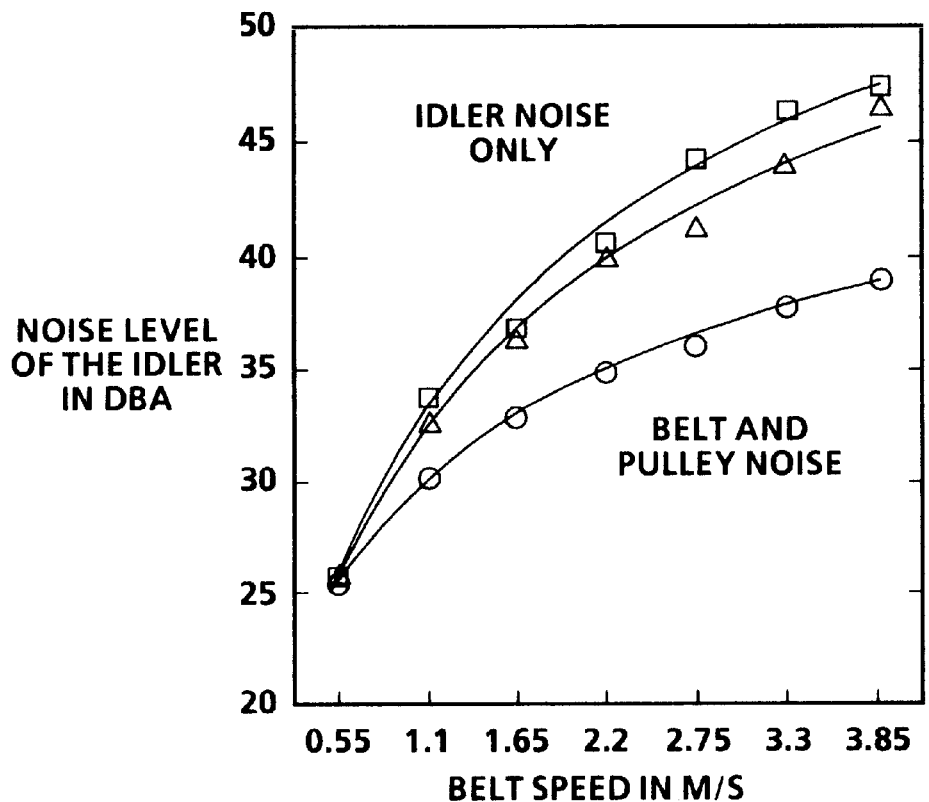
FIG. 1 is a graph showing test results according to a prior art belt drive system.

Belt drive systems in the past that incorporated idlers and timing belts have experienced noise problems whether they were used at low speeds or high speeds. For example, the graph in FIG. 1 shows noise level of an idler vis-a-vis that of a belt and pulley with the noise level of the idler being much higher than that of both the belt and pulley. Even at low speeds, the noise level of the idler is higher than that of belt and pulley combined. In FIG. 1, the torque applied was 0.1N–M, the normal force applied to the belt by the idler is shown as $\Delta=1N, \square=2N$ with the pulley center distance being 290 mm. The noise level of the belt and pulley is represented by O.

Figure 2:
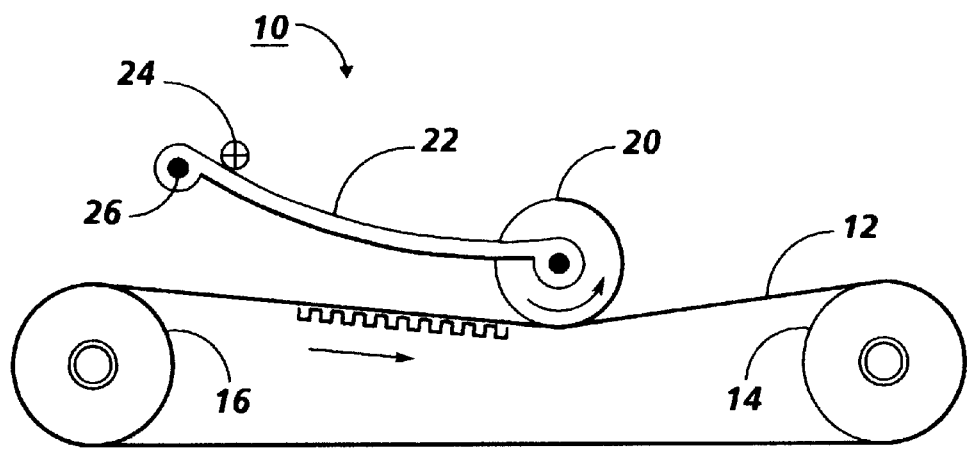
FIG. 2 is a schematic view illustrating a belt drive system utilizing a damping idler arm in accordance with the present invention.

To reduce idler noise, an apparatus 10 is shown in FIG. 2 that comprises an idler system with tuned damping capability. The term damping is used herein to mean the dissipation of vibratory/acoustic energy in a system. This is usually achieved by means of viscous or viscoelastic behavior which can be found in some plastic materials. In the FIG. 2 arrangement of a drive system for a machine, a single endless timing belt 12 is shown, which transmits drive power from a drive pulley 14, which in turn drives idler pulley 16. An idler 20 is biased against timing belt 12 in an unsupported span between pulleys 14 and 16 by a singgle piece and homogenous idler arm 22 with tuned damping that is made of materials with a relatively high damping coefficient, such as, Nylon. Materials other than Nylon having damping coeffients up to 2.0 could be used for damping purposes, if desired. The decision as to which material to use should be based on the predetermined magnitudes and dominant frequencies of the vibrations coming from the belt system. The unwanted noise/vibration coming from the belt system is dissipated due to the damping materials. This controls the motion of the idler/belt. With respect to configuration of the idler arm, it can be configured as disclosed in FIG. 2, and the damping of each arm could be fine tuned, as required, by changing the length and cross-section of the arm as one skilled in acoustics or noise control would appreciate. Idler arm 22 is supported for pivoted movement on support shaft/pin 26. A hard stop 24 is included to control maximum positioning of idler arm 22. Any hard stop means could be used, for example, they can be built into support 26 by use of a "D" hole. Idler arm 22 can be of any desired configuration as long as it provides support for the idler roll 20 and maintains tension for the belt. This system attenuates the undesirable vibrating energy and reduces noise.

In contrast to the idler arm of the present invention, no belt drive system is known that is as effective in reducing noise because the systems are not tuned. For example, U. S. Pat. Nos. 3,636,786; 4,908,006; 4,908,007; 1,286,482; 1,081,876; and 2,902,182 show belt control systems with idlers, but none are tuned.

An additional benefit of the idler noise control configuration in FIG. 2 is that the physical, chemical and mechanical properties including the materials of the tuned damping element can be optimized to provide active damping to attenuate the vibration of the belt system. With tuned damping, control of noise and vibration is enabled. In contrast to tuned damping element 22, traditional idler systems consist of a rigid support arm and a spring which may be a wrap spring or an extension spring. While a tuned damping arm 22 is shown in FIG. 2, an arm with damping material can be used to obtain some reduction in noise and vibration, but with less results than a tuned damping arm.

Tuned damping is used herein to mean a method and apparatus for controlling vibration/noise of a belt system. Assuming one has two systems as here including the belt system and the arm control mechanism, the belt system consists of the belt and two pulleys and the arm control mechanism consists of the arm, idler and the mountings. Tune damping is achieved by first predetermining the magnitude and the dominant frequencies'of the noise and vibration coming from the belt system. Then the arm control mechanism is designed by experiment for optimum control by means of optimum stiffness and damping. This can be achieved by choosing the length, width and thickness of the arm, selecting the proper system mass, as well as, the materials with the proper elastic modulus and damping coefficient. Thereby, the vibratory/acoustic energy generated from the belt system can be dissipated. Tuned damping is discussed in chapter 5, pages 189 through 215, of the book entitled Vibration Damping by Ahid D. Nashif, David I. G. Jones and John P. Henderson, distributed by John Wiley & Sons, New York, N.Y. and copyrighted in 1985.

Figure 3:
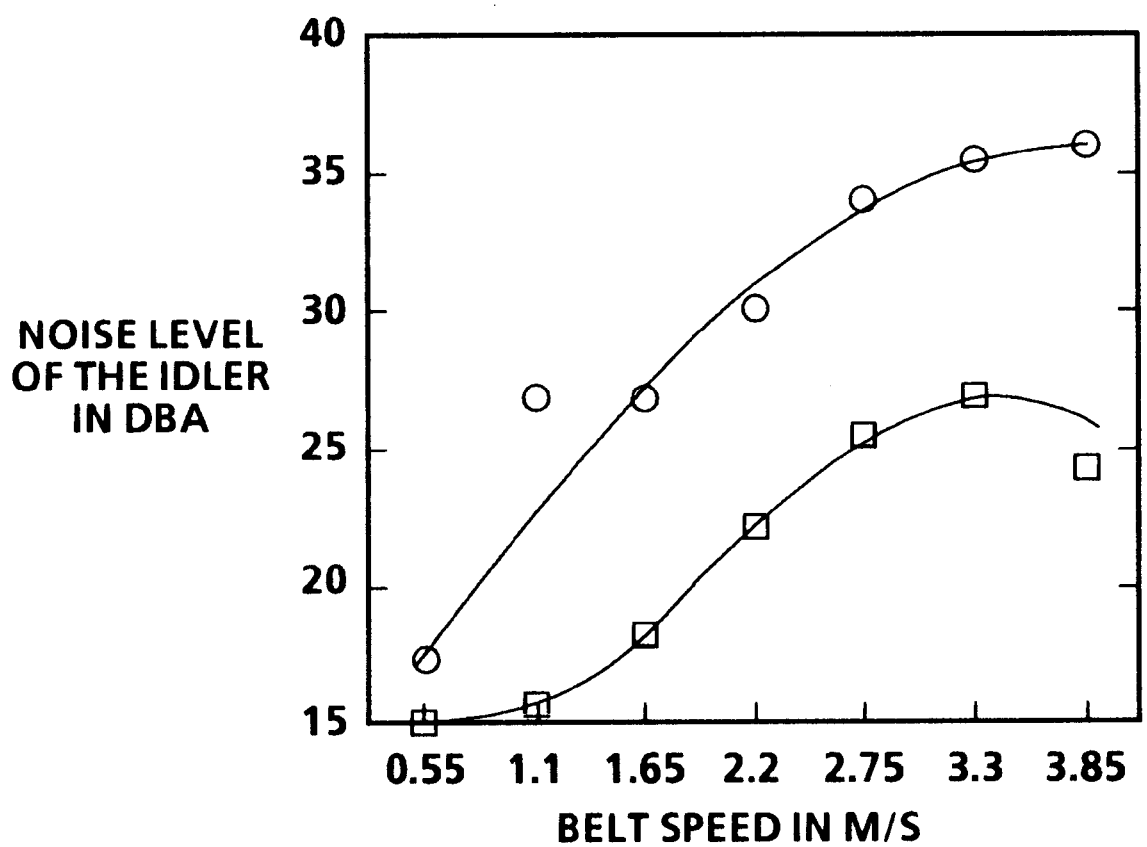
FIG. 3 is a graph showing the test results obtained from testing the apparatus of FIG. 2.

The system of FIG. 2 was tested with different idler configurations, such as, straight crown, solid, spoke and idlers with sleeves, etc. and they all showed marketed noise abatement improvement over existing design configurations. The test results shown in FIG. 3 were obtained using a solid idler having an outside diameter of 20 mm and a width of 13 mm. With this idler, a noise improvement of up to 12 dBA (i.e. 97%) was obtained. The upper curve and the lower curve in the figure represent the noise levels of an existing system and the tune damping system, respectively. The center of support shaft to center of idler length of tuned damping arm 22 was 56 mm and center of hard stop to center of idler distance was 44 mm for the test.

The system tested included idler arm 22 made of a material with a relatively high damping coefficient and having a pin or shaft extending orthogonally from an end thereof remote from shaft 26. An idler roll 20 was loosely mounted on the pin such that it could move to some extent laterally and vertically with results as shown in FIG. 1. Mounting of the idler roll on the pin of the idler roll could be in many conventional forms, for example, ball bearing could be used.

As will be readily understood from the foregoing description, in the belt drive and idler mounting arrangement according to the present invention, noise abatement is attained by including a tuned damping element attached to idlers operating on timing belts. This control mechanism reduces noise by providing the support and resiliency required for the idler operation. The tuned damping element is usable with roll systems, as well as, belt and drive systems. Belt and drive systems include, but are not limited to, flat belts, timing belts, V-belts, chain drives and some gear drives. It is also applicable to all tensioning devices. An advantage of the tuned damping element is that it allows self alignment at the point(s) of application(s).

The invention has been described in detail with particular reference to the preferred embodiment thereof, but it will be understood that reasonable variations and modifications are possible without departing from the spirit and basic scope of the invention.

We claim:

1. A machine including a belt drive system having at least one belt surrounding drive and driven rolls with an unsupported span of the belt therebetween, comprising;

a single piece, homogeneous, Nylon idler arm centrally supporting and biasing said idler into the belt between the drive roll and driven roll in order to tension the belt and attenuate vibratory energy created by the belt system; and stop means for limiting pivotal movement of said idler arm and biasing said idler arm towards said belt.

* * * * *